US012759397B2

(12) United States Patent
Song et al.

(10) Patent No.: US 12,759,397 B2
(45) Date of Patent: Oct. 13, 2026

(54) APPARATUS AND METHOD FOR PROVIDING DISTANCE-TO-EMPTY INFORMATION OF VEHICLE

(71) Applicants: HYUNDAI MOTOR COMPANY, Seoul (KR); KIA CORPORATION, Seoul (KR)

(72) Inventors: Kyeong Soo Song, Seoul (KR); Yong Kak Choi, Seoul (KR); Jae Yun Shim, Hwaseong-si (KR); Jin Hyung Lee, Seoul (KR); Seung Jae Yoo, Hwaseong-si (KR); Young Rang Lee, Gwangmyeong-si (KR); Jong Chan Jun, Hwaseong-si (KR); Hye Joo Lee, Bucheon-si (KR); Hyun Jong Ha, Hwaseong-si (KR); Jae Yeong Jeong, Hwaseong-si (KR); Gum Jin Park, Anyang-si (KR); Sung Chan Park, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 228 days.

(21) Appl. No.: 18/795,879

(22) Filed: Aug. 6, 2024

(65) Prior Publication Data

US 2025/0187435 A1 Jun. 12, 2025

(30) Foreign Application Priority Data

Dec. 12, 2023 (KR) ........................ 10-2023-0179264

(51) Int. Cl.
*B60K 35/28* (2024.01)
*B60L 58/16* (2019.01)

(52) U.S. Cl.
CPC .............. *B60K 35/28* (2024.01); *B60L 58/16* (2019.02); *B60K 2360/167* (2024.01); *B60K 2360/169* (2024.01); *B60L 2250/16* (2013.01)

(58) Field of Classification Search
CPC ........ B60K 35/28; B60K 35/22; B60K 35/21; B60K 35/80; B60K 2360/167;
(Continued)

(56) References Cited

U.S. PATENT DOCUMENTS 6,961,656 B2 * 11/2005 Kim ........................ F02D 29/02 701/123
9,037,327 B2 5/2015 Kim
(Continued)

FOREIGN PATENT DOCUMENTS

JP 2020-102932 A 7/2020
JP 6825650 B2 2/2021
(Continued)

*Primary Examiner* — Russell Frejd
(74) *Attorney, Agent, or Firm* — MCDONNELL BOEHNEN HULBERT & BERGHOFF LLP

(57) ABSTRACT

A method of providing distance-to-empty information of a vehicle includes determining, by a controller, based on an initial distance to empty (DTE), which is a distance to empty at the beginning of vehicle driving, an initial predicted DTE, which is a predicted distance to empty that changes as the vehicle is driven, determining, by the controller, a current DTE, which is an actual distance to empty, in real time for each set distance during vehicle driving, and controlling, by the controller, the operation of the display device to display actual DTE history information representing a history of change in the determined current DTE as an actual driving distance increases during vehicle driving along with the initial predicted DTE information, and an information provision apparatus configured to perform the method.

20 Claims, 8 Drawing Sheets

(58) Field of Classification Search
CPC ........ B60K 2360/169; B60K 2360/174; B60L 58/16; B60L 2260/52; B60L 3/12; B60Y 2200/91
See application file for complete search history.

(56) References Cited

U.S. PATENT DOCUMENTS

| | | | | |
|---|---|---|---|---|
| 9,574,889 | B2 | 2/2017 | Kim et al. | |
| 10,157,510 | B2 | 12/2018 | Meyer et al. | |
| 11,433,778 | B2 | 9/2022 | Salter et al. | |
| 2012/0179314 | A1* | 7/2012 | Gilman | B60L 1/003 701/22 |
| 2013/0063283 | A1* | 3/2013 | Kashima | G01C 21/3679 340/988 |
| 2014/0372019 | A1* | 12/2014 | Skaff | B60R 16/0236 701/123 |
| 2015/0170426 | A1* | 6/2015 | You | B60L 1/003 701/123 |
| 2017/0059332 | A1* | 3/2017 | Choi | B60L 58/12 |
| 2020/0164761 | A1* | 5/2020 | Shin | B60L 58/12 |
| 2020/0164854 | A1* | 5/2020 | Obata | B60L 50/75 |
| 2020/0398666 | A1* | 12/2020 | Higuchi | B60K 6/24 |
| 2022/0176939 | A1* | 6/2022 | Poll | B60W 10/26 |
| 2025/0050783 | A1* | 2/2025 | Song | B60L 58/12 |
| 2025/0058790 | A1* | 2/2025 | Song | B60L 58/13 |

FOREIGN PATENT DOCUMENTS

| | | | |
|---|---|---|---|
| JP | 7010985 | B2 | 1/2022 |
| KR | 2020-0028116 | A | 3/2020 |

* cited by examiner

APPARATUS AND METHOD FOR PROVIDING DISTANCE-TO-EMPTY INFORMATION OF VEHICLE

CROSS REFERENCE TO RELATED APPLICATIONS

This application claims, under 35 U.S.C. § 119(a), the benefit of priority to Korean Patent Application No. 10-2023-0179264 filed on Dec. 12, 2023, the entire contents of which are incorporated herein by reference.

BACKGROUND

(a) Technical Field

The present disclosure relates to an apparatus and method for providing distance-to-empty information of an electric vehicle to a driver by displaying the information on a display device such as a cluster.

(b) Background Art

In general, a vehicle is provided with a function to predict the distance to empty (DTE) and to inform a driver thereof. For example, in internal combustion engine vehicles, the distance to empty is predicted based on the fuel level in a fuel tank and is provided to the driver through a cluster.

Similarly, in electric vehicles configured to be driven by a motor energized with battery power, the distance to empty is estimated based on the current residual battery energy (residual capacity) and is displayed on the cluster.

With fewer charging stations and longer charging times for electric vehicles compared to internal combustion engine vehicles, drivers are more interested in the distance to empty (DTE) of their electric vehicles.

In electric vehicles, the drivers are more sensitive to the distance to empty (DTE), and therefore it is important that the vehicle accurately calculate and display the distance to empty corresponding to the remaining energy in the battery in real time during driving.

It is known to estimate the distance to empty of a vehicle using the relationship between the residual energy of the battery and energy efficiency (electric economy) to provide information about the distance to empty of the vehicle. For example, U.S. Pat. No. 9,037,327 discloses a method of determining energy efficiency (electric economy) using accumulated information from the past and multiplying the determined energy efficiency by the current residual energy of the battery to determine the distance to empty.

In addition, U.S. Pat. No. 9,574,889 discloses a method of determining a final distance to empty by applying and combining a weighted factor to the past distance to empty and the current distance to empty on a given route and adjusting the determined distance to empty based on the occurrence of an event. The disclosed method determines and adjusts the distance to empty using accumulated information from the past and front event information.

The '327 patent utilizes past energy efficiency to determine the distance to empty in order to resolve uncertainty in future driving predictions, but this assumes that past energy consumption trends will be maintained in the future. However, if the traffic conditions in the future are different from those in the past, the energy efficiency based on past information may be subject to large errors.

The '889 patent updates the distance to empty whenever an energy-consuming event occurs, which may result in an over- or under-representation of the impact of the event on the remaining driving path.

Various other methods of estimating and predicting the distance to empty are known, and vehicle manufacturers are using their own methods to predict the distance to empty, and then display the predicted distance-to-empty information through a cluster in order to provide the same to a driver.

However, there are many quality complaints that prediction accuracy of the distance to empty (hereinafter referred to as "DTE") is not high, resulting in a large difference between the change in DTE and the actual driving distance. In order to solve these complaints, a conventional method of providing the minimum (MIN) DTE and the maximum (MAX) DTE through the cluster along with the current DTE is known.

However, in the conventional method, the minimum DTE and the maximum DTE learned based on recent driving conditions tend to fluctuate significantly, which is inconsistent with the meaning of DTE as a predictor of future distance to empty, since the driver's future driving behavior is unpredictable.

Also, in the conventional method, after setting a destination on a navigation device, the predicted DTE value and the actual DTE value are displayed in real time through a display device of a vehicle's infotainment system (Audio Video Navigation Telematics; hereinafter referred to as "AVNT") while driving to the destination.

However, in the case of the conventional method that shows the predicted DTE value and the actual DTE value through the AVNT, there is a problem that the function works only when the destination is set in the navigation device, and the final result of the difference between the actual and predicted values of energy consumed by each function can only be checked, not the history. That is, it is not possible to check the energy consumption history, and therefore it is not possible to know which function used more or less energy in which section.

The above information disclosed in this Background section is provided only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide an apparatus and method for providing distance-to-empty information of a vehicle capable of displaying a DTE predicted based on an initial DTE at the beginning of driving and actual DTE history and progress information during driving on an AVNT in real time, regardless of destination setting, thereby informing a driver whether the driving up to now is more efficient than initial prediction in terms of fuel economy.

It is another object of the present disclosure to provide an effective distance-to-empty display apparatus and method for encouraging driving based on fuel economy.

The objects of the present disclosure are not limited to that described above. The objects of the present disclosure will be clearly understood from the following description of embodiments and could be implemented by means defined in the claims and a combination thereof.

In one aspect, an apparatus for providing distance-to-empty information of a vehicle includes a display device configured to display the distance-to-empty information of the vehicle and a controller configured to control operation of the display device, wherein the controller determines, based on an initial distance to empty (DTE), which is a distance to empty at the beginning of vehicle driving, an initial predicted DTE, which is a predicted distance to empty that changes as the vehicle is driven, determines a current DTE, which is an actual distance to empty, in real time for each set distance during vehicle driving, and controls the operation of the display device to display actual DTE history information representing a history of change in the determined current DTE as an actual driving distance increases during vehicle driving along with the determined initial predicted DTE information.

In another aspect, a method of providing distance-to-empty information of a vehicle includes determining, by a controller, based on an initial distance to empty (DTE), which is a distance to empty at the beginning of vehicle driving, an initial predicted DTE, which is a predicted distance to empty that changes as the vehicle is driven, determining, by the controller, a current DTE, which is an actual distance to empty, in real time for each set distance during vehicle driving, and controlling, by the controller, the operation of the display device to display actual DTE history information representing a history of change in the determined current DTE as an actual driving distance increases during vehicle driving along with the initial predicted DTE information.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
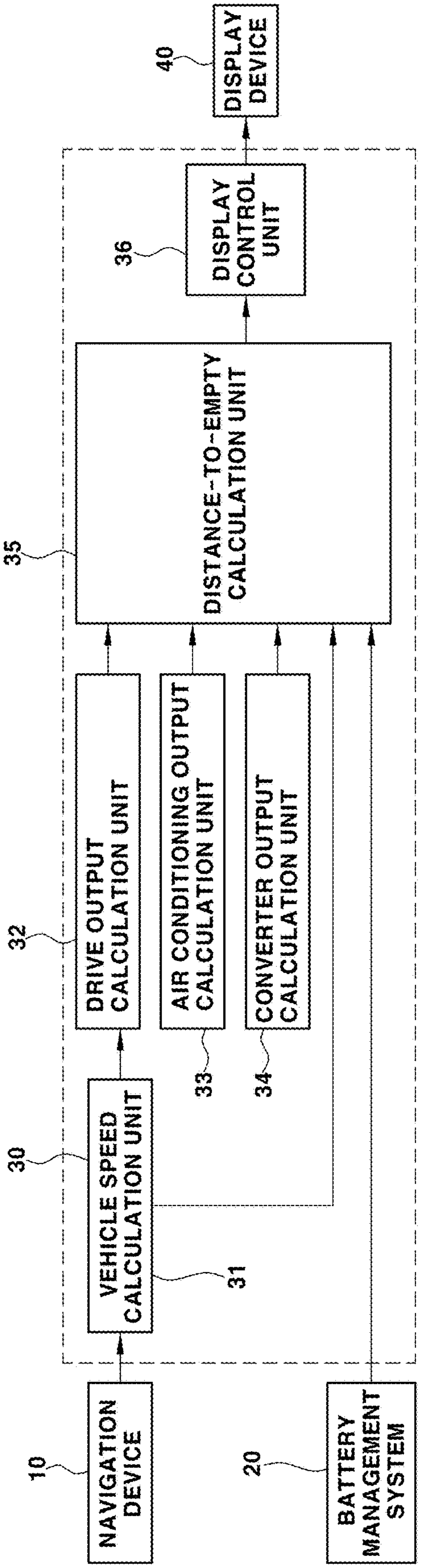
FIG. 1 is a view showing the configuration of an apparatus that performs a distance-to-empty information provision process according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure will be described in detail with reference to the accompanying drawings. Specific structural or functional descriptions of the embodiments of the present disclosure disclosed in this specification are given only for illustrating embodiments of the present disclosure. Embodiments of the present disclosure may be implemented in various forms. In addition, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms “first”, “second”, etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

It will be understood that, when a component is referred to as being “connected to” or “coupled to” another component, it may be directly connected to or coupled to the other component, or intervening components may be present. In contrast, when a component is referred to as being “directly connected to” or “directly coupled to” another component, there are no intervening components present. Other terms that describe the relationship between components, such as “between” and “directly between” or “adjacent to” and “directly adjacent to”, must be interpreted in the same manner.

Wherever possible, the same reference numbers will be used throughout the drawings to refer to the same or like parts. The terms used in this specification are provided only to explain specific embodiments, but are not intended to restrict the present disclosure. A singular representation may include a plural representation unless it represents a definitely different meaning from the context. It will be further understood that the terms “comprises”, “comprising” and the like, when used in this specification, specify the presence of stated components, steps, operations, and/or elements, but do not preclude the presence or addition of one or more other components, steps, operations, and/or elements.

The present disclosure relates to an information provision apparatus and method for displaying and providing distance-to-empty (hereinafter referred to as “DTE”) information of an electric vehicle to a driver.

In particular, the present disclosure relates to an apparatus and method for displaying DTE and energy consumption of an electric vehicle, characterized in that the initial predicted DTE calculated based on the initial DTE at the beginning of driving, regardless of whether a destination is set, and the actual DTE history and progress information during driving are displayed in real time through a display device, and the estimated energy consumption and actual energy consumption (drive, air conditioning, electric load, and battery management) are displayed in real time for each section of a specified distance.

In addition, the information provision apparatus and method according to the present disclosure may calculate a drive output using a low DTE vehicle speed and a high DTE vehicle speed set according to vehicle driving conditions such as a local area and a road, and constant speed fuel efficiency information reflecting vehicle specifications, and may calculate and provide low DTE and high DTE information that can be driven by driving conditions such as a local area and a road independently of learning using the calculated drive output.

The present disclosure provides low DTE and high DTE information that varies according to changes in available battery energy (battery residual energy) through a display device such as a cluster in a vehicle while displaying and providing the current DTE reflecting the driver's driving behavior and the current vehicle driving state to the driver every moment in real time through the cluster such that the current real-time DTE (hereinafter referred to as "current DTE" or "actual DTE") moves toward and converges on the high DTE, thereby inducing the driver to efficiently drive from an electric economy perspective.

The low DTE and high DTE provided by the present disclosure are learning-independent information, which may be values varying according to the changes in available battery energy without learning no matter what kind of driving the driver does.

In the present disclosure, the current DTE value may be displayed through a display device such as a cluster as described above, and a low DTE value and a high DTE value calculated based on available battery energy may be displayed together, whereby the driver may check the low DTE value and the high DTE value displayed on the display device while driving the vehicle and the current DTE value located between the low DTE value and the high DTE value in real time and may drive the vehicle such that the current DTE value is closer to the high DTE value than the low DTE value.

Figure 2:
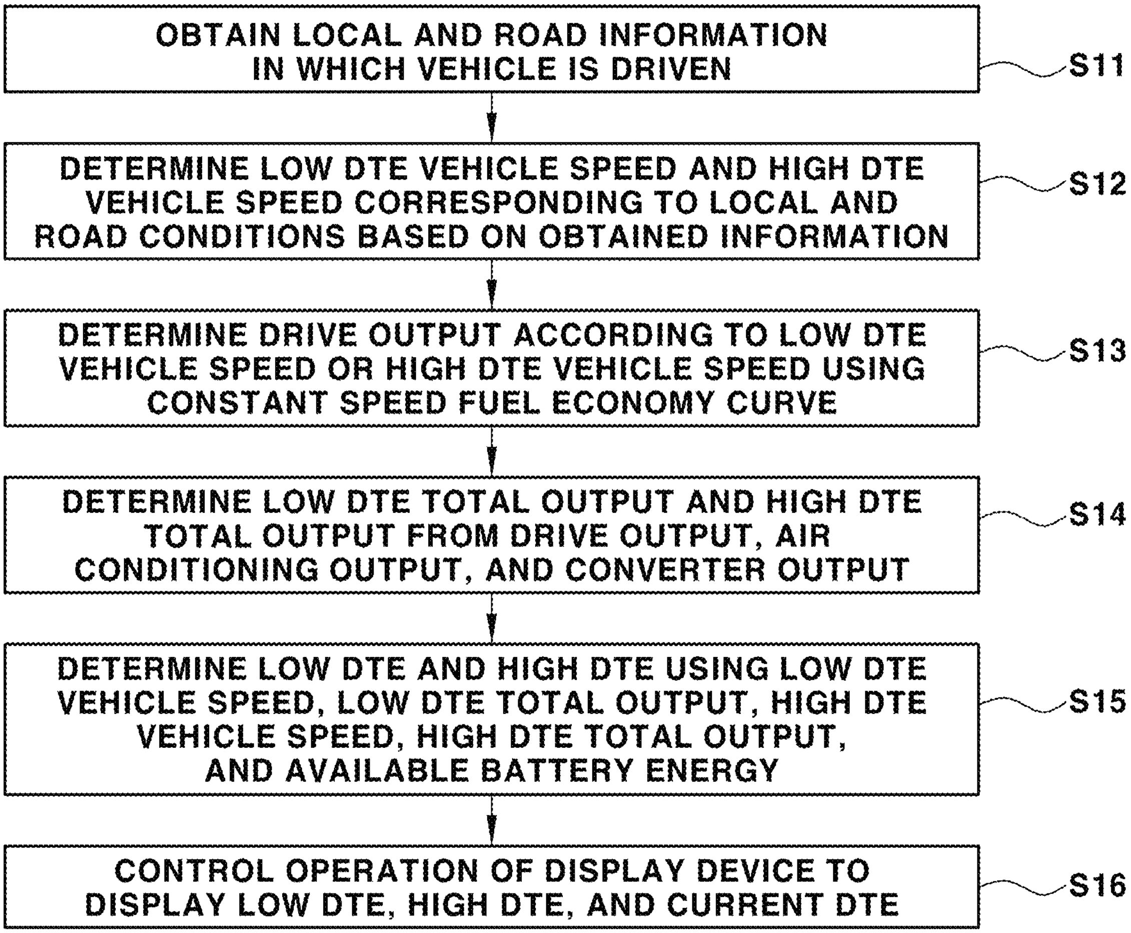
FIG. 2 is a view showing a method of determining a low distance-to-empty (DTE) value and a high DTE value in the present disclosure.

FIG. 1 is a view showing the configuration of an apparatus that performs a distance-to-empty information provision process according to the present disclosure, and FIG. 2 is a view showing a method of determining a low DTE value and a high DTE value in the present disclosure.

The process of FIG. 2 is performed by a controller 30 shown in FIG. 1, wherein the low DTE, high DTE, and current DTE are calculated and obtained in real time by the controller 30. In addition, low DTE, high DTE, and current DTE information determined by the controller 30 may be displayed on a display device 40 and provided to the driver.

In the present disclosure, a control process for distance-to-empty information provision may be performed by a plurality of controllers cooperatively controlling each other by exchanging necessary information, or control process for distance-to-empty information provision may be performed by a single integrated controller.

For example, the plurality of controllers may include a vehicle control unit (VCU), which is an upper controller, an HVAC controller (HVAC: heating, ventilation, & air conditioning, or dual automatic temperature control (DATC)), and a battery management system (BMS), and may further include an electric load controller.

Here, the electric load controller may be a controller of a converter that converts battery power and outputs the same to an electric part of the vehicle, i.e., a controller of a low voltage DC-DC converter (LDC).

In the present disclosure, a plurality of controllers and a single controller having an integrated function may be collectively referred to as a controller, and the control process of the present disclosure may be performed by the collective controller. In the following description, "controller" refers to the above-mentioned collective controller, unless otherwise specified.

Referring to FIG. 1, the controller 30 includes a vehicle speed calculation unit 31, a drive output calculation unit 32, an air conditioning output calculation unit 33, a converter output calculation unit 34, a distance-to-empty calculation unit 35, and a display control unit 36, and the controller 30 including these components may be the single controller having the integrated function.

Alternatively, if the control process according to the present disclosure is performed by a plurality of controllers provided in the vehicle, the air conditioning output calculation unit 33 may be an air conditioning controller, which is a separate controller, and the converter output calculation unit 34 may be an electric load controller (LDC controller), which is a separate controller.

Alternatively, the display control unit 36 may be a display controller, which is a separate controller connected to or included in the display device to control the operation of the display device 40. Here, the display device may be a display in an AVNT, and the display controller may be an AVNT controller.

In addition, the vehicle speed calculation unit 31, the drive output calculation unit 32, and the distance-to-empty calculation unit 35 may be components of a separate controller, such as a vehicle control unit (VCU).

Even in this case, the air conditioning controller, the converter controller, and the display controller, including the vehicle speed calculation unit 31, the drive output calculation unit 32, and the distance-to-empty calculation unit 35, may be collectively referred to as a controller, and the control process for distance-to-empty information provision according to the present disclosure may be performed by this collective controller.

In the present disclosure, the distance-to-empty calculation unit 35 of the controller 30 may determine a low DTE and a high DTE using the current available battery energy.

More specifically, the distance-to-empty calculation unit 35 of the controller 30 may calculate a low DTE using low fuel economy related information and the current available battery energy. In addition, the distance-to-empty calculation unit 35 of the controller 30 may calculate a high DTE using high fuel economy related information and the current available battery energy.

The low fuel economy related information includes the low DTE vehicle speed based on the current vehicle driving conditions and the low DTE total output, which is the total output of the battery at this low DTE vehicle speed.

In addition, the high fuel economy related information includes the high DTE vehicle speed based on the current vehicle driving conditions and the high DTE total output, which is the total output of the battery at this high DTE vehicle speed.

Thus, the distance-to-empty calculation unit 35 may calculate the low DTE using the low DTE vehicle speed and the low DTE total output, which are the low fuel economy related information, and the current available battery energy.

In addition, the distance-to-empty calculation unit 35 may calculate the high DTE using the high DTE vehicle speed and the high DTE total output, which are the high fuel economy related information, and the current available battery energy.

Here, the low DTE total output may be the total battery output at the low DTE vehicle speed, and the high DTE total output may be the total battery output at the high DTE vehicle speed.

In an embodiment of the present disclosure, the low DTE may be determined as the low DTE vehicle speed divided by the low DTE total output and multiplied by the current available battery energy, and the high DTE may be determined as the high DTE vehicle speed divided by the high DTE total output and multiplied by the current available battery energy.

This may be expressed as Mathematical Expression 1 and Mathematical Expression 2 below.

Low DTE=(low DTE vehicle Speed)/(low DTE total output)×(available battery energy) Mathematical Expression 1:

High DTE=(high DTE vehicle speed)/(high DTE total output)×(available battery energy) Mathematical Expression 2:

The low DTE vehicle speed and the high DTE vehicle speed may be determined by the vehicle speed calculation unit 31 of the controller 30 (step S12 in FIG. 2). As the low DTE vehicle speed and the high DTE vehicle speed, values preset by the vehicle speed calculation unit 31 as values according to vehicle driving conditions may be used, and the values may be values preset according to local conditions and road conditions. That is, a corresponding low DTE vehicle speed and high DTE vehicle speed may be determined by the vehicle speed calculation unit 31 according to local conditions and road conditions.

If the controller 30 that calculates the low DTE and the high DTE according to Mathematical Expressions 1 and 2 is a vehicle control unit, the vehicle control unit may receive real-time available battery energy information from the battery management system (BMS) 20 and may use the same to calculate the low DTE and the high DTE.

In an embodiment of the present disclosure, vehicle driving conditions include local conditions and road conditions in which the vehicle is driven. Also, in the present disclosure, the low DTE vehicle speed refers to a vehicle speed that can provide a short distance to empty (low DTE) depending on local conditions and road conditions, and the high DTE vehicle speed refers to a vehicle speed that can provide a long distance to empty (high DTE) depending on local conditions and road conditions.

In an embodiment of the present disclosure, the low DTE vehicle speed and the high DTE vehicle speed are preset as values according to local conditions and road conditions, and then a corresponding low DTE vehicle speed and high DTE vehicle speed for each local condition and road condition are pre-input, set, and stored in the vehicle speed calculation unit 31 of the controller 30.

Accordingly, in the vehicle speed calculation unit 31 of the controller 30, a low DTE vehicle speed and a high DTE vehicle speed corresponding to the local area and road where the vehicle is currently driven may be determined from the setting information in which the low DTE vehicle speed and the high DTE vehicle speed are set for each local and road condition.

Here, the local and road information in which the vehicle is currently driven may be obtained by the vehicle speed calculation unit 31 of the controller 30 from navigation information output from a navigation device 10 (step S11 in FIG. 2). Here, the navigation device 10 may be a telematics-based (e.g., Bluelink or UVO) navigation device.

That is, the controller 30 may obtain local condition and road condition information for determining the low DTE vehicle speed and the high DTE vehicle speed from the current vehicle location information and the driving road information among the navigation information input from the navigation device 10.

Table 1 below shows an example in which the low DTE vehicle speed and the high DTE vehicle speed are set, wherein the figures are exemplary and the present disclosure is not limited thereby, and the values of low DTE vehicle speed and high DTE vehicle speed may be varied according to local conditions and road conditions.

TABLE 1

| | Korea and Europe | | North America | |
|---|---|---|---|---|
| | Low DTE vehicle speed (km/hr) | High DTE vehicle speed (km/hr) | Low DTE vehicle speed (km/hr) | High DTE vehicle speed (km/hr) |
| Highway | 120 | 80 | 130 | 90 |
| City road | 100 | 60 | 110 | 70 |

As illustrated in Table 1, highways have higher average vehicle speeds than city roads, and North America has higher average vehicle speeds than Korea and Europe. Higher average vehicle speeds generally increase the distance to empty, and therefore low DTE vehicle speed and high DTE vehicle speed may be set to higher values for conditions with higher average vehicle speeds for local conditions and road conditions.

In addition, referring to Table 1, it can be seen that the low DTE vehicle speed is set to a higher vehicle speed than the high DTE vehicle speed, which can obtain a long distance to empty (high DTE) because the low DTE vehicle speed is the vehicle speed at which a short distance to empty (low DTE) can be obtained. Driving at high speeds results in a shorter distance to empty than driving at low speeds, and therefore the low DTE vehicle speed, which results in a short distance to empty, is set to a higher vehicle speed value than the high DTE vehicle speed, which results in a long distance to empty.

In an embodiment of the present disclosure, the low DTE total output and the high DTE total output refer to the total battery output, which may be determined by the distance-to-empty calculation unit 35 of the controller 30 as the sum of the drive output and the air conditioning output or as the sum of the drive output, the air conditioning output, and the converter output.

Here, the drive output refers to the battery output used by a motor to drive the vehicle, which is determined by the drive output calculation unit 32 of the controller 30 as a value corresponding to a high DTE vehicle speed or a low DTE vehicle speed, which is an appropriate vehicle speed by local condition and road condition (step S13 in FIG. 2), and is then input to the distance-to-empty calculation unit 35.

In addition, the air conditioning output is determined by the air conditioning output calculation unit 33 and is input to the distance-to-empty calculation unit 35, and the converter output is determined by the converter output calculation unit 34 and is input to the distance-to-empty calculation unit 35.

The air conditioning output means a battery output used for air conditioning, and the converter output means a battery output to an electric part. The converter output may be an output of an LDC that converts the battery power and outputs the same to an electric part of the vehicle.

In an embodiment of the present disclosure, the air conditioning output and the LDC output do not have a low DTE and high DTE distinction, but the drive output has a low DTE and high DTE distinction. That is, the drive output includes a low DTE drive output and a high DTE drive output, the low DTE drive output is used by the distance-to-empty calculation unit 35 to calculate the low DTE total output, and the high DTE drive output is used by the distance-to-empty calculation unit 35 to calculate the high DTE total output (step S14 in FIG. 2).

In the drive output calculation unit 32 of the controller 30, the low DTE drive output and the high DTE drive output may be determined by a mathematical expression that takes as input variables the low DTE vehicle speed and the high DTE vehicle speed input from the vehicle speed calculation unit 31. This mathematical expression may be a cubic expression, such as a relational expression of "vehicle speed-drive output" that defines a correlation between the vehicle speed and the drive output.

$$\text{Drive Output}=a_1\times\text{vehicle speed}+a_2\times(\text{vehicle speed})^2+a_3\times(\text{vehicle speed})^3 \quad \text{Mathematical Expression 3:}$$

Mathematical Expression 3 above is a cubic expression representing a constant speed fuel economy curve, and the cubic expression of "vehicle speed-driving power" may be determined by conducting constant speed fuel economy tests and evaluations for the vehicle type in advance in the vehicle development stage, and the values of the coefficients of the cubic expression, $a_1$, $a_2$, and $a_3$, may be obtained.

In Mathematical Expression 3, the coefficients a1, a2, and a3, which are setting information for the mathematical expression of the constant speed fuel economy curve, are vehicle-specific values that represent the characteristics of the specifications of the vehicle and may be obtained through the constant speed fuel economy testing and evaluation process for that vehicle type.

In the present disclosure, the coefficients of the constant speed fuel economy curve are pre-input and stored in the drive output calculation unit 32 of the controller 30, and are used to calculate the drive output through the mathematical expression of the constant speed fuel economy curve from the appropriate vehicle speed corresponding to the current local conditions and road conditions.

That is, the above coefficients may be used to calculate the low DTE drive output and the high DTE drive output from the low DTE vehicle speed and the high DTE vehicle speed, respectively, through the mathematical expression of the constant speed fuel economy curve.

Mathematical Expression 4 and Mathematical Expression 5 below represent the cubic expressions of the constant speed fuel economy curve for calculating the low DTE drive output and the high DTE drive output from the low DTE vehicle speed and the high DTE vehicle speed.

$$\text{Low DTE drive output}=a_1\times(\text{low DTE vehicle speed})+a_2\times(\text{low DTE vehicle speed})^2+a_3\times(\text{low DTE vehicle speed})^3 \quad \text{Mathematical Expression 4:}$$

$$\text{High DTE drive output}=a_1\times(\text{high DTE vehicle speed})+a_2\times(\text{high DTE vehicle speed})^2+a_3\times(\text{high DTE vehicle speed})^3 \quad \text{Mathematical Expression 5:}$$

Meanwhile, as described above, the low DTE total output and the high DTE total output, which mean the total output of the battery, may be determined by the distance-to-empty calculation unit 35 of the controller 30 as the sum of the drive output from the drive output calculation unit 32 and the air conditioning output from the air conditioning output calculation unit 33, wherein calculation of the air conditioning output from the air conditioning output calculation unit 33 may be performed through a conventional process of calculating the air conditioning output using an air conditioning thermal model.

Thus, the distance-to-empty calculation unit 35 of the controller 30 may determine the low DTE total output as the sum of the low DTE drive output and the air conditioning output, and may determine the high DTE total output as the sum of the high DTE drive output and the air conditioning output (step S14 in FIG. 2).

Alternatively, the converter output, which represents the battery output to the electric part (electric load) of the vehicle, may be further used to determine the total output, wherein the converter output from the converter output calculation unit 34 may be an LDC output as described above.

Thus, in the distance-to-empty calculation unit 35 of the controller 30, the low DTE total output may be determined as the sum of the low DTE drive output, the air conditioning output, and the LDC output, and the high DTE total output may be determined as the sum of the high DTE drive output, the air conditioning output, and the LDC output (step S14 in FIG. 2).

In an embodiment of the present disclosure, the LDC output may be a learned value, and a new LDC output value is stored in the converter output calculation unit 34 of the controller 30 for every preset kilometer of driving for driver propensity learning.

That is, the converter output calculation unit 34 of the controller 30 has n buffers, and the LDC output value is stored in one of the n (e.g., 25) buffers for each kilometer of driving, and one of the values stored in the n buffers is updated with the new LDC output value for each kilometer of driving.

In addition, among the n values stored in the n buffers, the LDC output values of the last m (e.g., 10) buffers may be averaged and the average value may be used as the final LDC output value.

Table 2 below shows an example in which the LDC output value is calculated.

TABLE 2

| | Buffer No. | | | | | | | | | | | |
|---|---|---|---|---|---|---|---|---|---|---|---|---|
| | 1 | 2 | . . . | 16 | 17 | 18 | 19 | 20 | 21 | 22 | 23 | 24 | 25 |
| LDC output (kW) | 0.70 | 0.71 | . . . | 0.67 | 0.68 | 1.01 | 1.03 | 1.02 | 0.52 | 0.51 | 0.53 | 0.51 | 0.46 |

In the example of Table 2, one LDC output value that is updated every time the vehicle is driven a preset distance (e.g., 1 kilometer) is stored in each of the buffers, totaling 25, the LDC output values of the last 10 buffers, among the total 25 LDC output values stored sequentially, are averaged, and the average value is used as the final LDC output value.

In the example of Table 2, 0.70 kW, which is the average of the LDC output values stored in the 16th to 25th buffers, is determined as the final LDC output value.

In this way, the LDC output may be learned. However, since the LDC output is a relatively small value compared to the drive output and air conditioning output and the fluctuation of the LDC output is also small, a fixed value, i.e., a certain preset LDC output value for the vehicle, may be used without learning as the LDC output value.

Eventually, when the low DTE total output and the high DTE total output are obtained by the distance-to-empty calculation unit 35 of the controller 30 through the above process, the low DTE value and the high DTE value may be obtained as represented by Mathematical Expression 1 and Mathematical Expression 2 using the low DTE total output, the high DTE total output, the low DTE vehicle speed and the high DTE vehicle speed from the vehicle speed calculation unit 31, and the available battery energy from the battery management system 20 (step S15 in FIG. 2).

Table 3 below shows an example of low DTE and high DTE of an arbitrary vehicle obtained for each local condition and road condition.

TABLE 3

| | Korea and Europe | | | | North America | | | |
|---|---|---|---|---|---|---|---|---|
| | Low DTE vehicle speed | Low DTE | High DTE vehicle speed | High DTE | Low DTE vehicle speed | Low DTE | High DTE vehicle speed | High DTE |
| Highway | 120 | 274 | 80 | 415 | 130 | 244 | 90 | 379 |
| City road | 100 | 343 | 60 | 466 | 110 | 307 | 70 | 445 |

In this way, once the low DTE and high DTE values are determined, the display control unit 36 of the controller 30 may control the operation of the display device 40 such that the low DTE value, the high DTE value, and the current DTE value are displayed on the display device 40 in a predetermined manner (step S16 in FIG. 2).

The current DTE (actual DTE) is calculated to reflect the driver's driving behavior and current vehicle driving conditions, and may be calculated by any conventional method.

Various methods are known for calculating the current DTE in real time using real-time driving state information such as driving road conditions, e.g., the slope of the road, and current vehicle speed, in addition to the driver's driving behavior with respect to acceleration and deceleration while driving the vehicle, and one of the known methods may be adopted and used.

Since various methods of calculating the current DTE in real time are known to a person having ordinary skill in the art to which the present disclosure pertains, a detailed description of the method of calculating the current DTE will be omitted from this specification.

The display control unit 36 of the controller 30 controls the operation of the display device 40 to display the current DTE value thus determined along with the low DTE value and the high DTE value, whereby the current DTE, low DTE, and high DTE values may be provided to the driver through the display device 40.

Eventually, the current DTE, which reflects the driver's driving behavior and the current vehicle driving state along with the low DTE and the high DTE as described above may be displayed and provided to the driver at each moment in real time through the display device 40, such as a cluster, such that the current DTE can move toward and converge on the high DTE, thereby inducing the driver to efficiently drive from an electric economy perspective.

Meanwhile, apart from displaying the low DTE, high DTE, and current DTE as described above, the initial predicted DTE calculated based on the initial DTE at the beginning of driving, regardless of whether a destination is set, and the actual DTE history and progress information during driving may be displayed in real time through the display device, and the estimated energy consumption and actual energy consumption (drive, air conditioning, electric load, and battery management) may be displayed in real time for each section of a specified distance.

In the configuration of FIG. 1, the navigation device is used to obtain local condition and road condition information for determining the low DTE vehicle speed and the high DTE vehicle speed as described above, but this is only using the current driving location, and it is possible to obtain local condition and road condition information corresponding to the current driving location from the navigation information even if a destination is not set.

In the present disclosure, the low DTE and high DTE obtained as described above can be displayed on the display device as real-time information along with the current DTE, or the low DTE and high DTE may be calculated and displayed in real-time, and when the vehicle operation ends, the final low DTE and high DTE values are stored and used as the initial low DTE and initial high DTE values at the time of vehicle key on as described below.

In a coordinate system having the actual driving distance and DTE as coordinate values, the present disclosure performs control to display the initial predicted DTE as a graph representing a decreasing value as the actual driving distance increases with the initial DTE value as a starting point. In the graph representing the initial predicted DTE, the initial predicted DTE corresponding to each actual driving distance is the initial DTE value minus each actual driving distance.

In addition, the present disclosure controls the display of the actual DTE history, which represents a history of changes in the current DTE during vehicle driving in the coordinate system along with the graph representing the initial predicted DTE as a graph representing successive current DTE values as the actual driving distance increases such that a comparison between the initial predicted DTE value and the actual DTE history can be made for each actual driving distance.

In addition, the present disclosure generates a predicted low DTE graph, which is a line representing a decreasing value as the actual driving distance increases with an initial low DTE value, which is a value less than the initial DTE value at the beginning of vehicle driving, as a starting point, and a high DTE graph, which represents a decreasing value as the actual driving distance increases with an initial high DTE value, which is a value greater than the initial DTE value at the beginning of vehicle driving, as a starting point, and displays the same along with the graph representing the initial predicted DTE.

Also, in a display screen of the display device, the predicted energy consumption and the actual energy consumption during the driving of the vehicle are displayed as values based on the actual driving distance, in addition to displaying the initial predicted DTE and the actual DTE history as values based on the actual driving distance.

Figure 3:
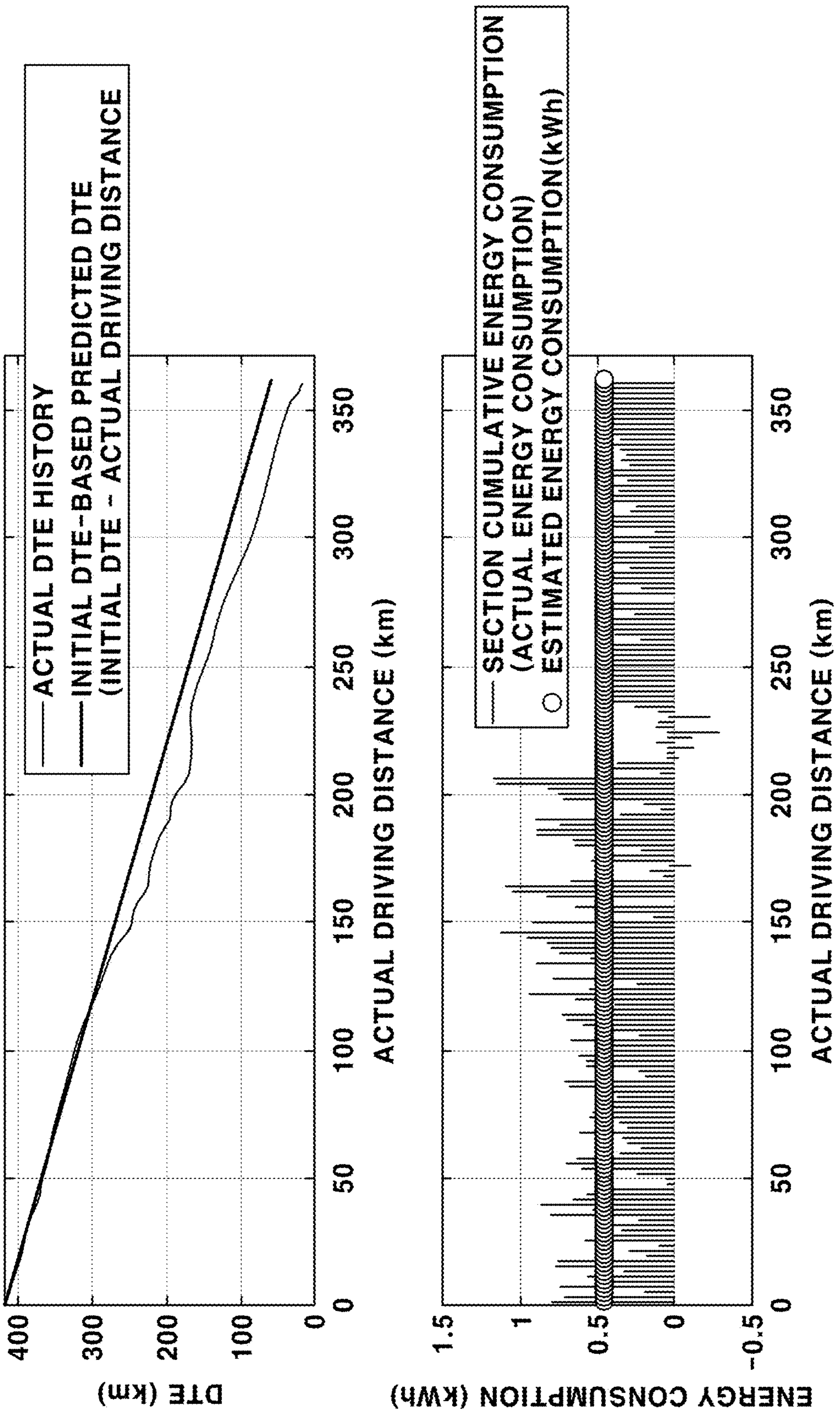
FIG. 3 is a view showing an example of a distance-to-empty (DTE) display state according to the present disclosure.

Describing the present disclosure in more detail, FIG. 3 is a view showing an example of a distance-to-empty display state according to the present disclosure, wherein the horizontal axis (x-axis) represents the distance driven by the vehicle (hereinafter referred to as "actual driving distance") in kilometers, and the vertical axis (y-axis) represents the DTE value in kilometers. As the actual driving distance on the horizontal axis, the value of an odometer may be used.

Figure 4:
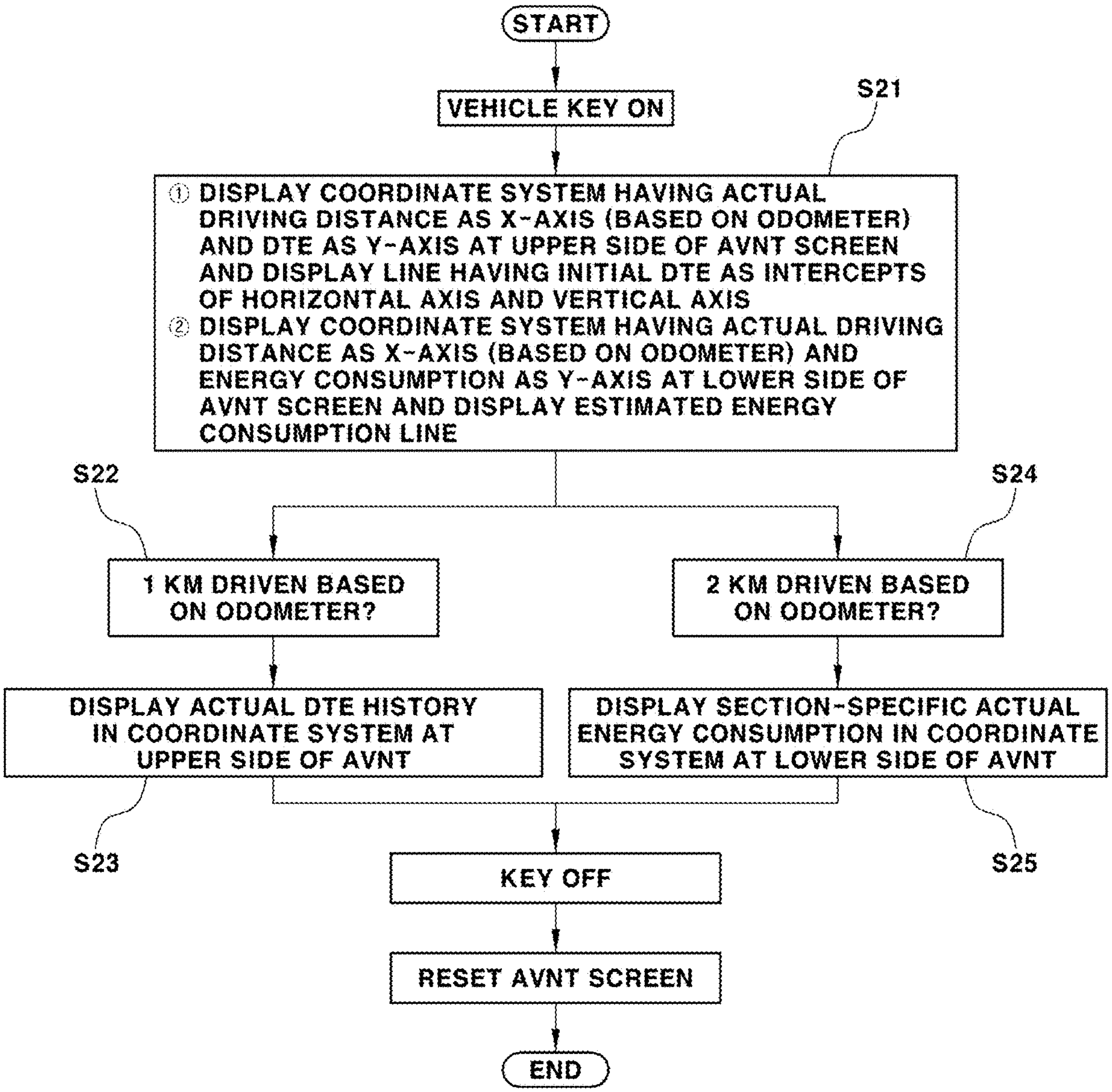
FIG. 4 is a flowchart showing a distance-to-empty display method according to the present disclosure.

FIG. 4 is a flowchart showing a distance-to-empty display method according to the present disclosure. The distance-to-empty display method according to the present disclosure will be described with reference to FIGS. 3 and 4.

FIG. 3 shows an example of distance-to-empty information displayed on the display device (AVNT), including the DTE at the time of vehicle key on and at the time of driving start (departure time) (hereinafter referred to as the "initial DTE"), the DTE predicted based on the initial DTE during vehicle driving (hereinafter referred to as the "initial predicted DTE"), and the actual DTE history during vehicle driving (the current real-time DTE change history), plotted together on a graph for comparison.

As the actual driving distance increases while the vehicle is driven, the initial predicted DTE may be obtained by subtracting the actual driving distance from the initial DTE, and may be displayed as a straight line with a certain slope.

As an example of a method of generating and displaying the initial predicted DTE value, it is possible to determine the initial DTE value at the time of vehicle key on as an intercept on the y-axis, which is the vertical axis, and to generate and display a straight line with the same value as an intercept on the x-axis, which is the horizontal axis (see step S21 in FIG. 4).

In addition, in FIG. 3, the actual DTE history is a graph of the change and history of the current real-time DTE, i.e., the current DTE calculated by reflecting the driver's driving behavior and the current vehicle driving state as described above. Based on the value of the odometer, which is the actual driving distance, the actual DTE (current DTE) value may be received from the AVNT every 1 km, which is a set distance, to display the actual DTE history graph (see steps S22 and S23 in FIG. 4).

In the present disclosure, the initial DTE value is the current DTE value at the time of vehicle key on, i.e., at the time of driving start and departure, and therefore the initial DTE and the actual DTE (current DTE) start from the same value at the time of vehicle key on and departure (see FIG. 3).

Thus, in the present disclosure, in the coordinate system of the DTE display screen during vehicle driving, the continuous change of the current DTE calculated at a set distance of 1 km, i.e., the actual DTE history data, is displayed as a graph such as a line graph, in addition to displaying the initial predicted DTE as a straight line graph, wherein the last point of the actual DTE history graph represents the current DTE.

In the present disclosure, the initial predicted DTE, the actual DTE history, and the current DTE are displayed as a line and graph as shown in FIG. 3 such that the driver can compare and recognize the same in real time and such that the driver can compare his/her current DTE as well as previous actual DTE change (change in the current DTE value) and history with the initial predicted DTE.

Provision of the information and comparison of DTE data may be done independently of setting a destination in the navigation device, and real-time destination-independent DTE information may be provided to the driver.

In addition, FIG. 3 shows another example of display information displayed on the display device in the present disclosure, wherein the estimated energy consumption based on the actual driving distance (based on the odometer value) and the actual energy consumption are displayed together at the bottom of the DTE information.

In the energy consumption display information, the horizontal axis represents the actual driving distance (km) and the vertical axis represents the energy (kWh), and the estimated energy consumption and the actual energy consumption (drive, air conditioning, electric load, battery management, etc.) may be calculated for each section of a set distance (e.g., 2 km) and may be displayed in the form of a bar graph or the like in a coordinate system having the actual driving distance and energy consumption as coordinate values so as to be provided to the driver (see steps S21, S24, and S25 in FIG. 4).

That is, when the drive output calculation unit 32, the converter output calculation unit 34, the air conditioning output calculation unit 33, and the battery management system 20 calculate the drive energy consumption, the electric load energy consumption, the air conditioning energy consumption, and the battery management energy consumption for each section, the section cumulative energy consumption obtained by summing the above calculated energy consumptions for each section (e.g., a 2 kilometer section based on the odometer) is displayed on the display device 40 in the form of a bar graph or the like.

Here, drive energy consumption is the battery energy consumed by a vehicle driving system, such as a motor, during vehicle driving, and the electric load energy consumption is the battery energy consumed by a low-voltage electric part of the vehicle. In addition, the air conditioning energy consumption is the battery energy consumed for vehicle air conditioning, and the battery management energy consumption is the battery energy consumed by an electrical device of the vehicle, such as a battery heater, for battery management such as battery conditioning.

Separately, the estimated energy consumption is calculated using the available battery energy and initial DTE at the time of driving start, i.e., at the time when the vehicle is keyed on, and is displayed as the estimated energy consumption for each section of a set distance.

Referring to FIG. 3, the estimated energy consumption is shown to remain the same as the initial value obtained at the time of vehicle key on. That is, the initial value obtained at the time of vehicle key on is plotted as an intercept on the vertical axis (y-axis), and the estimated energy consumption value for each section is plotted as a straight line representing the same value as the initial value.

In this way, the estimated energy consumption is displayed on the energy consumption display screen, and the actual energy consumption for each section (section cumulative energy consumption) is superimposed on the estimated energy consumption during vehicle driving.

Figure 5:
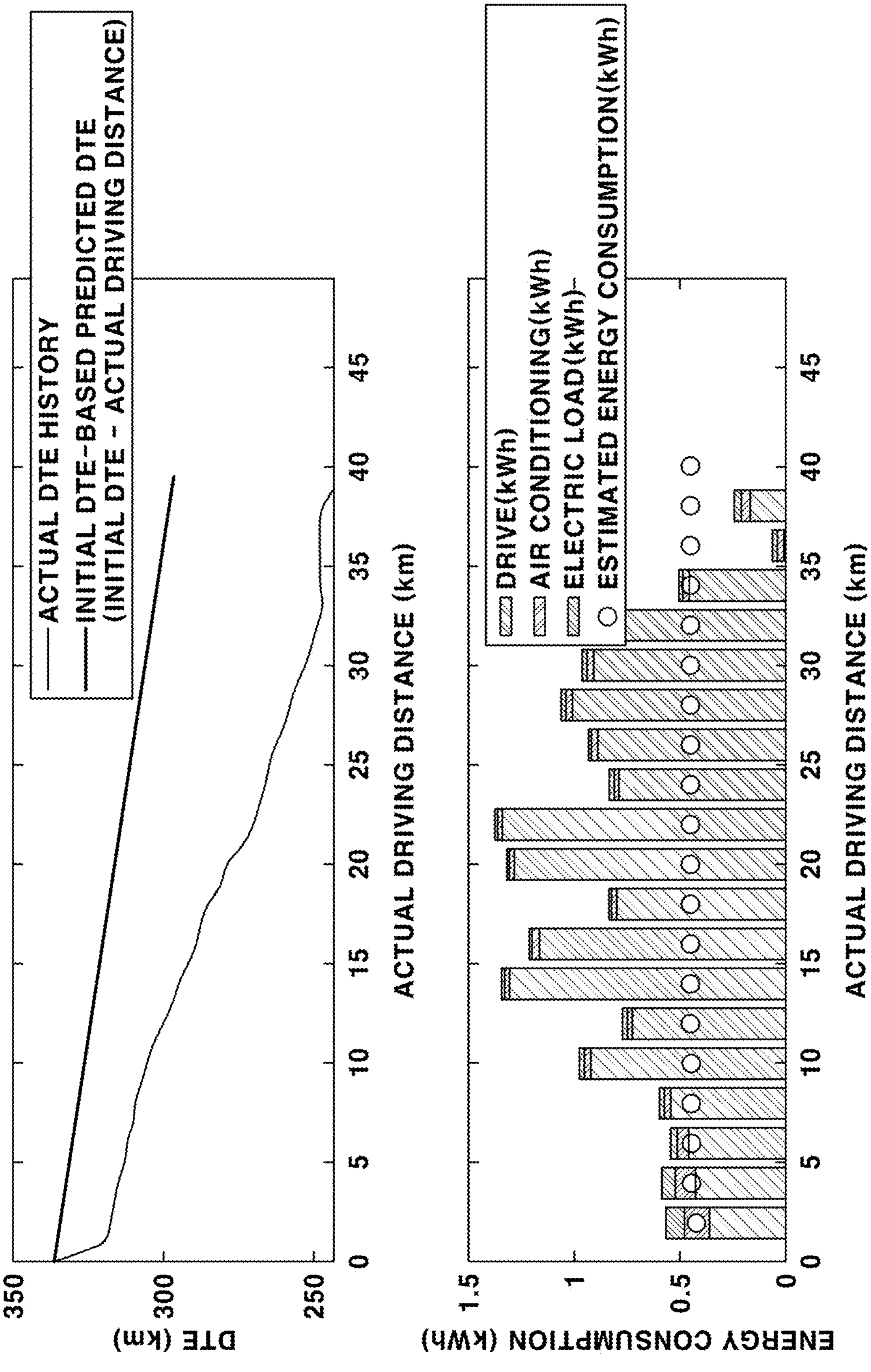
FIGS. 5 and 6 are views showing examples in which a distance-to-empty information provision method according to the present disclosure is described.
Figure 6:
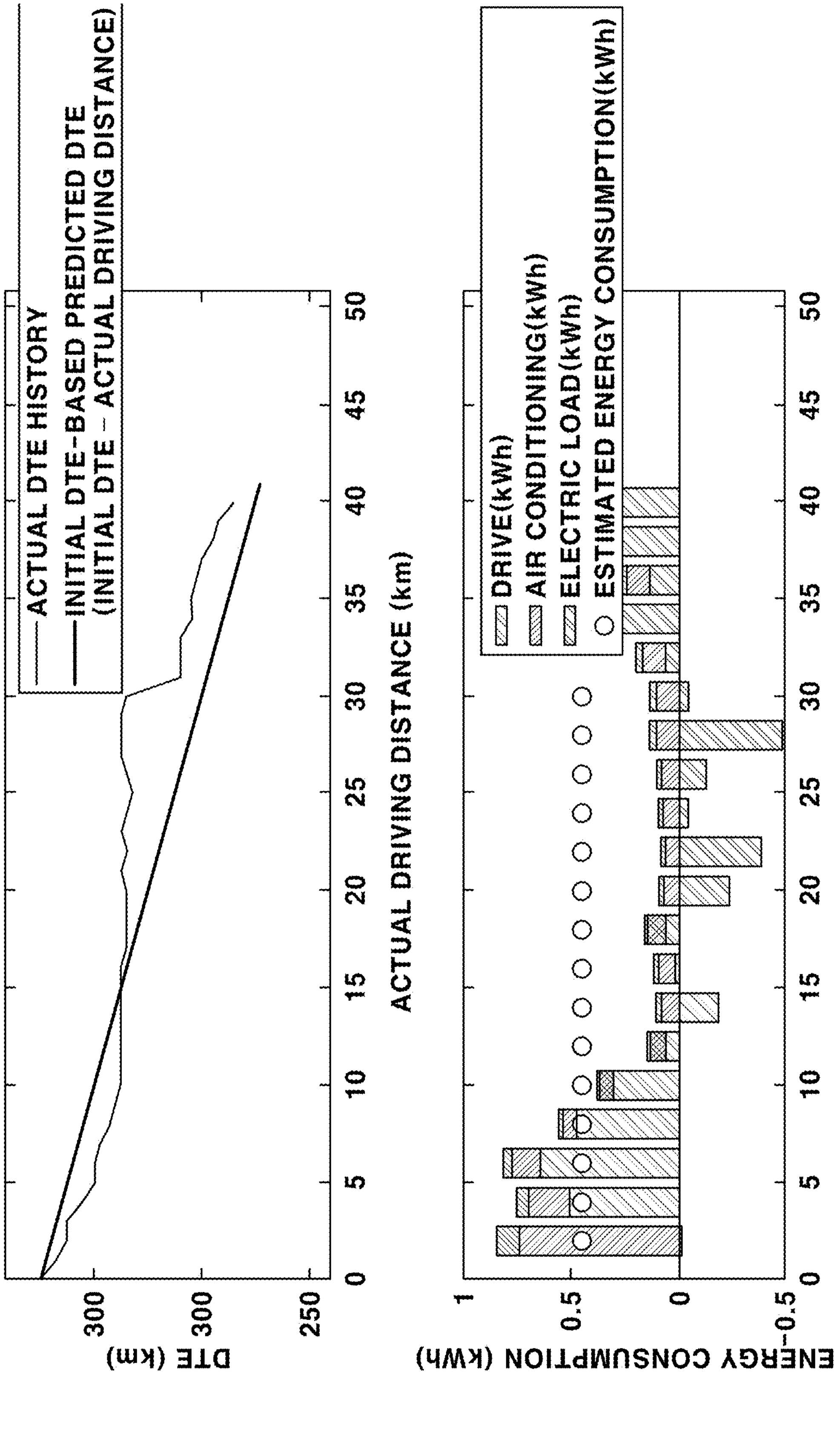

FIGS. 5 and 6 are views showing examples in which a distance-to-empty information provision method according to the present disclosure is described, wherein examples in which the initial DTE, the initial predicted DTE, the actual DTE history, the real-time current DTE, and the estimated energy consumption and actual energy consumed history for each section are displayed on the display device (e.g., a display of the AVNT) are shown.

Referring to FIG. 5, it can be seen that, in the middle sections during vehicle driving, the drive energy consumption significantly increases and the actual DTE (current DTE) significantly decreases compared to the initial predicted DTE. This indicates that the vehicle was driven at high speeds and uphill in the sections.

Referring to FIG. 6, it can be seen that the actual DTE decreases from the initial predicted DTE due to large air conditioning energy consumption in the early sections. Also, in the middle sections, the drive energy consumption is negative, which indicates that the vehicle was driven downhill. It can also be seen that the actual DTE increases from the initial predicted DTE because there is a lot of regenerative braking in the downhill sections.

Figure 7:
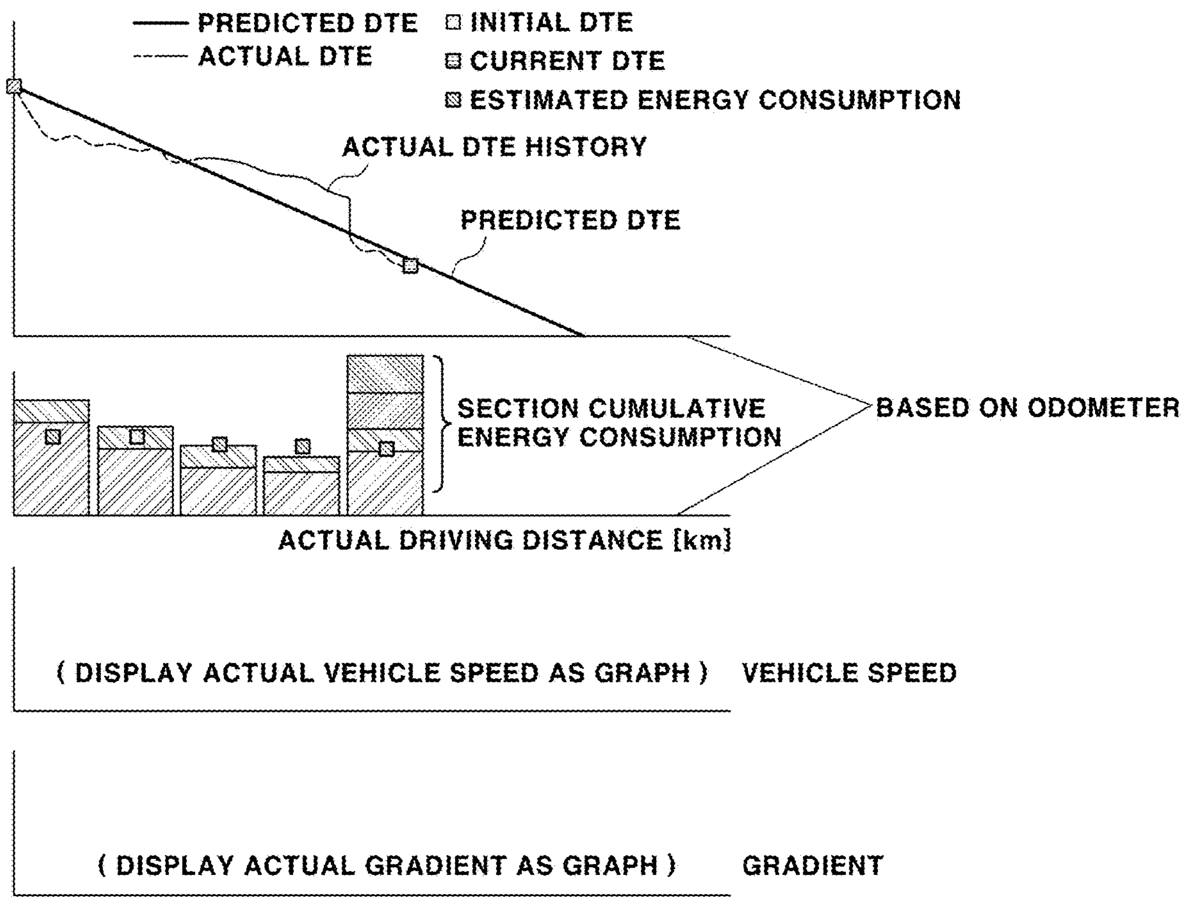
FIG. 7 is a view showing another example of the distance-to-empty information provision method according to the present disclosure.

FIG. 7 is a view showing another example of the distance-to-empty information provision method according to the present disclosure, wherein a straight line having the initial DTE value at the time of vehicle key on as intercepts of the vertical axis (y-axis) and the horizontal axis (x-axis) is generated to display the initial predicted DTE value.

In addition, the change in the current DTE value obtained in real time for each set distance (e.g., 1 km) during vehicle driving, i.e., the actual DTE history data, is displayed as a line graph. The starting point of the actual DTE history graph represents the initial DTE value, which is the same as the starting point of the initial predicted DTE. The final value in the actual DTE history graph represents the current DTE value.

In addition, the energy consumption information is displayed at the bottom of the DTE information by section, the estimated energy consumption by section is displayed as a dot using coordinate information, and the actual energy consumption by section, which is section cumulative energy consumption used for drive, air conditioning, electric load, and battery management, is displayed in the form of a bar graph.

Here, battery management includes battery conditioning performed to optimally charge the battery, wherein energy consumed for battery management includes energy consumed for battery temperature control during the battery conditioning process, such as energy consumed for battery heating (battery heater energy consumption) to raise the battery temperature.

In the example of FIG. 7, actual vehicle speed and actual driving road gradient information, which is information acquired by the vehicle in real time, may be displayed on the display device along with DTE information and energy consumption information such that the driver can determine whether the reason for the increase or decrease in drive energy is due to the vehicle speed or the gradient based on the displayed information. In FIG. 7, an example of an actual display of the vehicle speed and gradient information, which may be represented by a graph or the like, is omitted.

Figure 8:
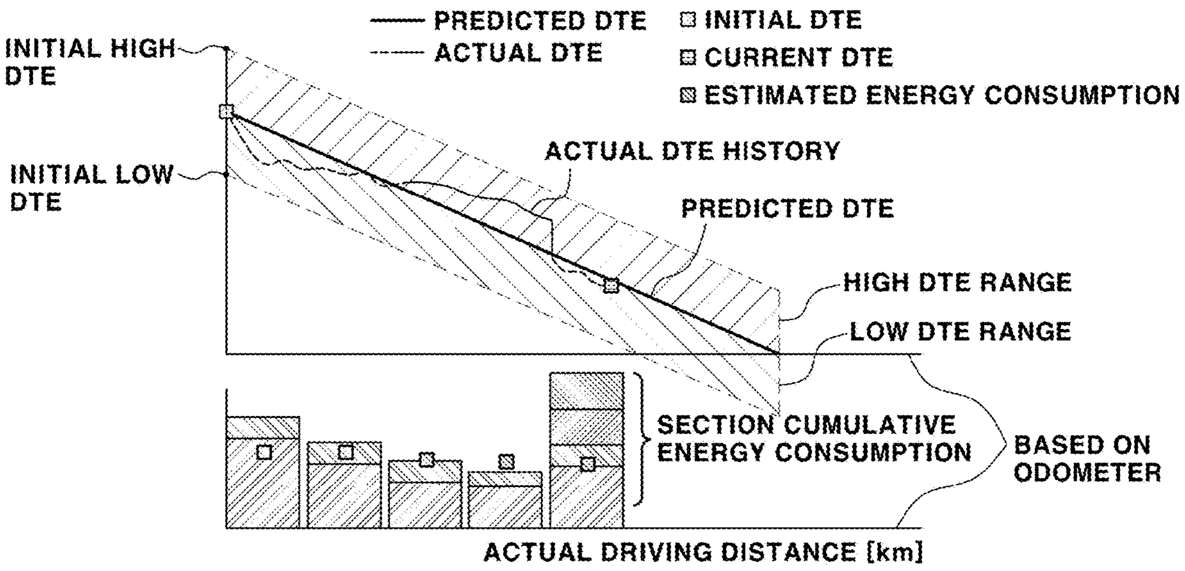
FIG. 8 is a view showing a further example of the distance-to-empty information provision method according to the present disclosure.

FIG. 8 is a view showing a further example of the distance-to-empty information provision method according to the present disclosure, wherein an example of displaying a low DTE range and a high DTE range on the DTE information display screen is shown.

As shown, a straight line having the value of the low DTE at the time of vehicle key on (referred to as an "initial low DTE") as the intercepts of the horizontal axis (x-axis) and the vertical axis (y-axis) may be generated and displayed as a graph representing a predicted low DTE value.

Similarly, a straight line with the value of the high DTE at the time of vehicle key on, i.e., at the time when driving is possible, (referred to as an "initial high DTE") as the intercepts of the horizontal axis (x-axis) and the vertical axis (y-axis) may be generated and displayed as a graph representing the predicted high DTE value.

Also, in a coordinate system having the actual driving distance and the DTE in distance units as values of the horizontal axis and the vertical axis, a first region between the initial predicted DTE graph and the predicted high DTE graph is defined as a high DTE range, and a second region between the initial predicted DTE graph and the predicted low DTE graph is defined as a low DTE range.

In this case, the Low DTE range in the display information is a lower region bottom based on the initial predicted DTE graph, and is the range between the initial predicted DTE and the predicted Low DTE based on the same driving distance.

Also, in the display information, the high DTE range is an upper region based on the initial predicted DTE graph, and is the range between the initial predicted DTE and the predicted high DTE based on the same driving distance. In this case, the graph representing the actual DTE history is displayed in one of the first region and the second region.

Also, in the present disclosure, the controller may control the operation of the display device to display, on the display screen, the first region between the initial predicted DTE graph and the predicted high DTE graph and the second region between the initial predicted DTE graph and the predicted low DTE graph in different colors.

That is, the low DTE range and the high DTE range may be displayed in their respective predetermined colors. The corresponding regions of the two DTE ranges colored in different colors designated for each range may be displayed such that the two DTE ranges divided based on the initial predicted DTE line on the display screen can be easily distinguished and identified by the driver.

The low DTE range and the high DTE range are displayed together to show how the driver's actual DTE history proceeds within the low and high DTE ranges, which may guide the driver to drive with efficient fuel economy.

As is apparent from the foregoing, in the apparatus and method for providing distance-to-empty information of the vehicle according to the present disclosure, the DTE predicted based on the initial DTE at the beginning of driving and the actual DTE history and progress information during driving may be displayed on the AVNT in real time, regardless of destination setting, and the driver may be informed whether the driving up to now is more efficient than the initial prediction in terms of fuel economy.

In addition, in conjunction with the DTE display, the estimated energy consumption and the actual energy consumption (drive, air conditioning, electric load, and battery management) are shown in real time for each section of a set distance, making it easier for the driver to understand why the DTE is different from the actual driving distance, and a full history about which energy was used lot in which section is shown, providing guidance on which energy the driver should save and encouraging more efficient driving from a fuel economy perspective.

It will be apparent to a person of ordinary skill in the art that the present disclosure described above is not limited to the above embodiments and the accompanying drawings and that various substitutions, modifications, and variations can be made without departing from the technical idea of the present disclosure.

The invention claimed is:

1. An apparatus for providing distance-to-empty (DTE) information of a vehicle, the apparatus comprising:

a display device configured to display the distance-to-empty information of the vehicle; and a controller configured to control operation of the display device;

wherein the controller is configured to determine, based on an initial distance to empty (DTE), which is a distance to empty at a beginning of vehicle driving, an initial predicted DTE, which is a predicted distance to empty that changes as the vehicle is driven, to determine a current DTE, which is an actual distance to empty, in real time for each set distance during vehicle driving, and to control the display device to display actual DTE history information representing a history of change in the determined current DTE as an actual driving distance increases during vehicle driving along with the determined initial predicted DTE information.

2. The apparatus according to claim 1, wherein the initial predicted DTE is displayed as a graph representing a decreasing value as the actual driving distance increases with the initial DTE value as a starting point in a coordinate system having the actual driving distance and the DTE as coordinate values.

3. The apparatus according to claim 2, wherein, in a graph representing the initial predicted DTE, the initial predicted DTE value corresponding to each actual driving distance is determined by subtracting each actual driving distance from the initial DTE value.

4. The apparatus according to claim 2, wherein the controller is configured to generate a straight line with the initial DTE value as an intercept of a horizontal axis and an intercept of a vertical axis in a coordinate system having the actual driving distance as the horizontal axis and the DTE as the vertical axis, such that the straight line is displayed in the coordinate system as a graph representing the initial predicted DTE at the beginning of vehicle driving.

5. The apparatus according to claim 2, wherein during vehicle driving, the actual DTE history information is displayed as a graph representing a history of change in successive current DTE as the actual driving distance increases in the coordinate system in conjunction with a graph representing the initial predicted DTE, whereby the initial predicted DTE value and the actual DTE history are compared for each actual driving distance.

6. The apparatus according to claim 2, wherein the controller is configured to generate a predicted low DTE graph, which is a line representing a decreasing value as the actual driving distance increases with an initial low DTE value, which is a value less than the initial DTE value at the beginning of vehicle driving, as a starting point, and a high DTE graph, which represents a decreasing value as the actual driving distance increases with an initial high DTE value, which is a value greater than the initial DTE value at the beginning of vehicle driving, as a starting point, and is configured to control the display device to display the generated low DTE graph and the high DTE graph along with the graph representing the initial predicted DTE.

7. The apparatus according to claim 1, wherein the controller is configured to control the display device to display the initial predicted DTE and the actual DTE history as values based on the actual driving distance, and to display estimated energy consumption and actual energy consumption during vehicle driving as values based on the actual driving distance on a display screen of the display device.

8. The apparatus according to claim 7, wherein in a coordinate system having the actual driving distance and the energy consumption as coordinate values, section-specific actual energy consumption calculated for each section of a preset distance during vehicle driving is displayed as a bar graph and estimated energy consumption is superimposed on the actual energy consumption for each section.

9. The apparatus according to claim 8, wherein the section-specific actual energy consumption is battery energy consumed in real time for each section, which is determined as a sum of drive energy consumption by a driving system comprising a motor configured to drive the vehicle, electric load energy consumption by an electric part, air conditioning energy consumption for vehicle air conditioning, and battery management energy consumption for battery management.

10. The apparatus according to claim 1, wherein the controller is configured to calculate estimated energy consumption using available battery energy and the initial DTE at the beginning of vehicle driving, and to display the calculated estimated energy consumption as section-specific estimated energy consumption for each section of a preset distance during vehicle driving.

11. The apparatus according to claim 1, wherein the controller is configured to control the display device to display the initial predicted DTE and the actual DTE history as values based on the actual driving distance, and to display a vehicle speed and a road gradient during vehicle driving as values based on the actual driving distance on a display screen of the display device.

12. The apparatus according to claim 1, wherein the controller is configured to determine a low fuel economy related information and a high fuel economy related information based on current vehicle driving conditions, to determine a low DTE value and a high DTE value based on the determined low fuel economy related information, the determined high fuel economy related information, and current available battery energy, and to control the display device to display the determined low DTE value, the determined high DTE value, and the current DTE value.

13. A method of providing distance-to-empty information of a vehicle, the method comprising:

determining, by a controller, based on an initial distance to empty (DTE), which is a distance to empty at a beginning of vehicle driving, an initial predicted DTE, which is a predicted distance to empty that changes as the vehicle is driven;

determining, by the controller, a current DTE, which is an actual distance to empty, in real time for each set distance during vehicle driving, and controlling, by the controller, a display device to display actual DTE history information representing a history of change in the determined current DTE as an actual driving distance increases during vehicle driving along with the initial predicted DTE information.

14. The method according to claim 13, wherein, in controlling the display device, the initial predicted DTE is displayed as a graph representing a decreasing value as the actual driving distance increases with the initial DTE value as a starting point in a coordinate system having the actual driving distance and the DTE as coordinate values.

15. The method according to claim 14, wherein the controller generates a straight line with the initial DTE value as an intercept of a horizontal axis and an intercept of a vertical axis in a coordinate system having the actual driving distance as the horizontal axis and the DTE as the vertical axis, wherein the straight line is displayed in the coordinate system as a graph representing the initial predicted DTE at the beginning of vehicle driving.

16. The method according to claim 14, wherein during vehicle driving, the actual DTE history information is displayed as a graph representing a history of change in successive current DTE as the actual driving distance increases in the coordinate system in conjunction with a graph representing the initial predicted DTE, whereby the initial predicted DTE value and the actual DTE history are compared for each actual driving distance.

17. The method according to claim 14, wherein the controller generates a predicted low DTE graph, which is a line representing a decreasing value as the actual driving distance increases with an initial low DTE value, which is a value less than the initial DTE value at the beginning of vehicle driving, as a starting point, and a high DTE graph, which represents a decreasing value as the actual driving distance increases with an initial high DTE value, which is a value greater than the initial DTE value at the beginning of vehicle driving, as a starting point, and controls the operation of the display device to display the generated low DTE graph and the generated high DTE graph along with the graph representing the initial predicted DTE.

18. The method according to claim 13, wherein, in controlling the display device, the display device displays the initial predicted DTE and the actual DTE history as values based on the actual driving distance and to display estimated energy consumption and actual energy consumption during vehicle driving as values based on the actual driving distance on a display screen of the display device.

19. The method according to claim 18, wherein in a coordinate system having the actual driving distance and the energy consumption as coordinate values, section-specific actual energy consumption calculated for each section of a preset distance during vehicle driving is displayed as a bar graph and estimated energy consumption is superimposed on the actual energy consumption for each section.

20. The method according to claim 13, wherein, in controlling the display device, the display device displays the initial predicted DTE and the actual DTE history as values based on the actual driving distance and to display a vehicle speed and a road gradient during vehicle driving as values based on the actual driving distance on a display screen of the display device.

* * * * *